(12) United States Patent
Liu et al.

(10) Patent No.: US 11,542,163 B2
(45) Date of Patent: *Jan. 3, 2023

(54) CARBON NANOTUBE FIELD EMITTER AND PREPARATION METHOD THEREOF

(71) Applicants: Tsinghua University, Beijing (CN); HON HAI PRECISION INDUSTRY CO., LTD., New Taipei (TW)

(72) Inventors: Peng Liu, Beijing (CN); Duan-Liang Zhou, Beijing (CN); Chun-Hai Zhang, Beijing (CN); Li Qian, Beijing (CN); Yu-Quan Wang, Beijing (CN); Xue-Wei Guo, Beijing (CN); Li-Yong Ma, Beijing (CN); Fu-Jun Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 235 days.

This patent is subject to a terminal disclaimer.

(21) Appl. No.: 17/080,670

(22) Filed: Oct. 26, 2020

(65) Prior Publication Data

US 2021/0094827 A1 Apr. 1, 2021

Related U.S. Application Data

(62) Division of application No. 16/661,148, filed on Oct. 23, 2019, now Pat. No. 10,894,717.

(30) Foreign Application Priority Data

Jul. 16, 2019 (CN) .......................... 201910642083.7

(51) Int. Cl.
*C01B 32/158* (2017.01)
*H01J 1/304* (2006.01)
*H01J 9/02* (2006.01)

(52) U.S. Cl.
CPC ............ *C01B 32/158* (2017.08); *H01J 1/304* (2013.01); *H01J 9/025* (2013.01); *C01B 2202/08* (2013.01); *C01B 2202/22* (2013.01); *H01J 2201/30469* (2013.01)

(58) Field of Classification Search
CPC .............. C01B 32/158; C01B 2202/08; C01B 2202/22; C01B 32/168; C01B 32/159;
(Continued)

(56) References Cited

U.S. PATENT DOCUMENTS 10,734,181 B1 * 8/2020 Liu .................. H01J 9/025
2008/0170982 A1 * 7/2008 Zhang ................ H01L 51/444
423/447.3

(Continued)

FOREIGN PATENT DOCUMENTS

CN 101338452 1/2009
CN 101880035 11/2010
(Continued)

OTHER PUBLICATIONS

Dai, Carbon nanotubes: opportunities and challenges, Surface Science 2002; 500: 218-241 (Year: 2002).*
(Continued)

*Primary Examiner* — Daniel C. McCracken
(74) *Attorney, Agent, or Firm* — ScienBiziP, P.C.

(57) ABSTRACT

A carbon nanotube field emitter comprises at least two electrodes and at least one graphitized carbon nanotube structure. The at least one graphitized carbon nanotube structure comprises a first end and a field emission end. The first end is opposite to the field emission end. The first end
(Continued)

is fixed between the at least two electrodes, and the field emission end is exposed from the at least two electrodes and configured to emit electrons.

13 Claims, 15 Drawing Sheets

(58) Field of Classification Search
CPC ..... C01B 32/16; C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/10; C01B 2202/20; C01B 2022/22; C01B 2202/24; C01B 2202/26; C01B 2202/28; C01B 2202/30; C01B 2202/32; C01B 2202/34; C01B 2202/36; H01J 1/304; H01J 9/025; H01J 2201/30469; H01J 9/18; H01J 1/3042; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | | |
|---|---|---|---|
| 2011/0318255 A1 | 12/2011 | Liu et al. | |
| 2014/0185777 A1* | 7/2014 | Liu | H01J 35/065 378/122 |
| 2015/0364287 A1 | 12/2015 | Wei et al. | |

FOREIGN PATENT DOCUMENTS

| | | |
|---|---|---|
| CN | 203165848 | 8/2013 |
| TW | 201601182 | 1/2016 |

OTHER PUBLICATIONS

Fitzer, et al., Recommended Terminology for the Description of Carbon as a Solid, Pure & Appl. Chem. 1995; 67(3): 473-506 (Year: 1995).*

Huang, et al., 99.9% purity multi-walled carbon nanotubes by vacuum high-temperature annealing, Carbon 2003; 41: 2585-2590 (Year: 2003).*

Andrews, et al., Purification and structural annealing of multiwalled carbon nanotubes at graphitization temperatures, Carbon 2001; 39: 1681-1687 (Year: 2001).*

* cited by examiner

CARBON NANOTUBE FIELD EMITTER AND PREPARATION METHOD THEREOF

CROSS-REFERENCE TO RELATED APPLICATIONS

This application is a division application of U.S. patent application Ser. No. 16/661,148, filed on Oct. 23, 2019, entitled, "CARBON NANOTUBE FIELD EMITTER AND PREPARATION METHOD THEREOF", which claims all benefits accruing under 35 U.S.C. § 119 from China Patent Application No. 201910642083.7 filed on Jul. 16, 2019, in the China National Intellectual Property Administration, the contents of which are hereby incorporated by reference. The disclosures of the above-identified applications are incorporated herein by reference.

FIELD

The present disclosure relates to an evaporating source for a carbon nanotube field emitter and preparation method thereof.

BACKGROUND

In recent years, due to the research and development in carbon nanotubes and nanomaterials, the broad application prospects of the novel materials are constantly emerging. For example, due to the unique electromagnetic, optical, mechanical, and chemical properties of the carbon nanotubes, a large number of applications have been developed in field emission electron sources, sensors, new optical materials, and soft ferromagnetic materials.

The field emission characteristics of the carbon nanotube have broad application prospects in fields such as field emission planar display devices, electric vacuum devices, and high-power microwave devices. Conventionally, a carbon nanotube film is used as a field emitter. Since the carbon nanotube film has a low density and the carbon nanotubes in the carbon nanotube film have growth defects, the finishing product of a carbon nanotube field emitter may has poor stability and short life. In addition, the carbon nanotube film is adhered to a surface of the electrode by an adhesive. Thus, the carbon nanotubes can be easily extracted during field emission, and the carbon nanotube field emitter has poor stability and short life.

BRIEF DESCRIPTION OF THE DRAWINGS

Implementations of the present technology will now be described, by way of embodiment, with reference to the attached figures.

DETAILED DESCRIPTION

Figure 1:
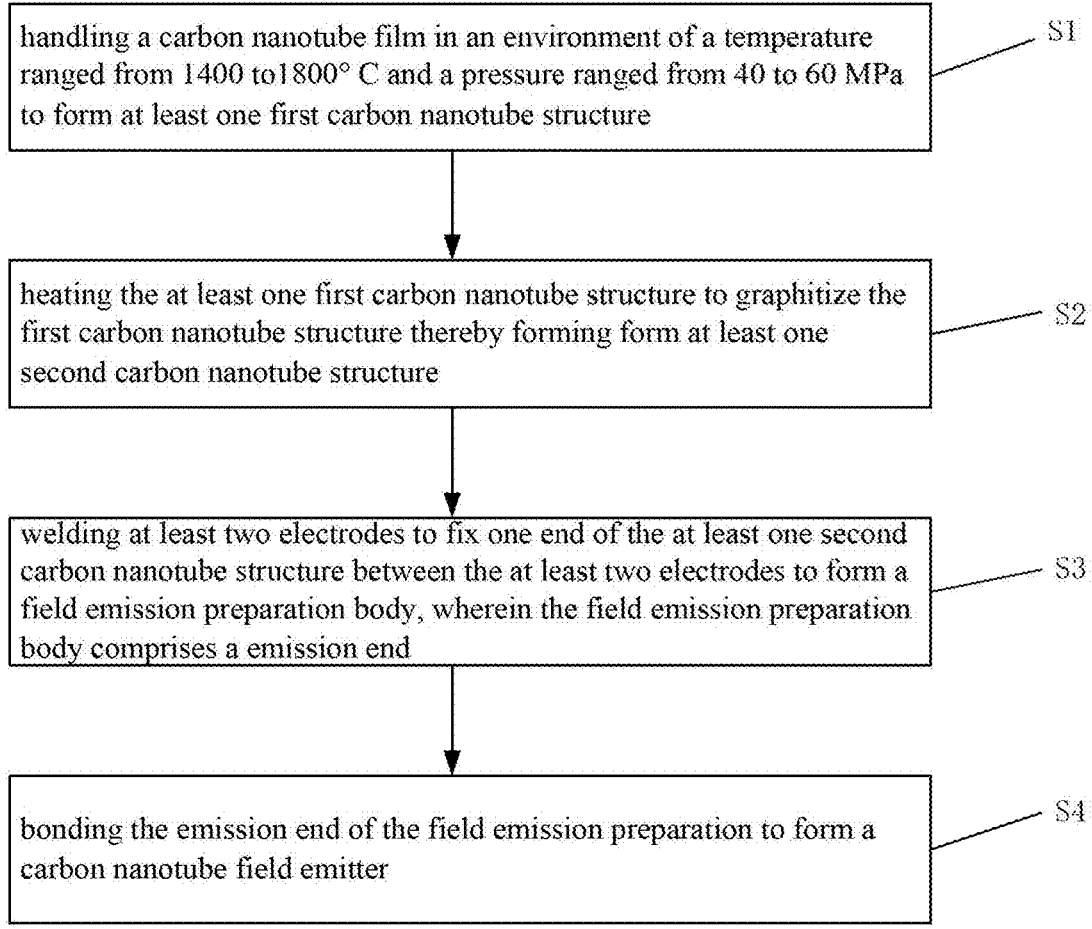
FIG. 1 is a flowchart of one embodiment of a method for making a carbon nanotube field emitter.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

In FIG. 1, one embodiment is described in relation to a method for making a carbon nanotube field emitter. The method comprises steps of:

step (S1), handling a carbon nanotube film in an environment of a temperature ranged from 1400 to 1800° C. and a pressure ranged from 40 to 60 MPa to form at least one first carbon nanotube structure;

step (S2), heating the at least one first carbon nanotube structure to graphitize the first carbon nanotube structure thereby forming form at least one second carbon nanotube structure;

step (S3), welding at least two electrodes to fix one end of the at least one second carbon nanotube structure between the at least two electrodes to form a field emission preparation body, wherein the field emission preparation body comprises a emission end; and step (S4), bonding the emission end of the field emission preparation to form a carbon nanotube field emitter.

In step (S1), the carbon nanotube film comprises a plurality of carbon nanotube drawn film, and the plurality of carbon nanotube drawn film stacked with each other. A thickness of the carbon nanotube film laminated is ranged from about 1 mm to about 10 mm. The carbon nanotube film is extruded by a roll under a pressure of 40-60 MPa at a temperature of 1400-1800° C. for 5-10 min to increase a density of the carbon nanotube film and form the first carbon nanotube structure. The density of the first carbon nanotube structure is greater than or equal to 1.6 g/m$^3$. The first carbon nanotube structure has a thickness ranged form about 10 micrometers to about 1 millimeter. In one embodiment, the carbon nanotube film is treated for 6 min under a temperature of 1600° C. and a pressure of 50 MPa to form the first carbon nanotube structure, a thickness of the first carbon nanotube structure is about 50 μm, and the density of the first carbon nanotube structure was 1.6 g/m$^3$.

The carbon nanotube drawn film can be formed by the substeps of: (a) selecting one or more carbon nanotubes having a predetermined width from the super-aligned array of carbon nanotubes; and (b) pulling the carbon nanotubes to form carbon nanotube segments that are joined end to end at an uniform speed to achieve a uniform carbon nanotube drawn film.

In step (a), the carbon nanotube segments having a predetermined width can be selected by using a tool such as an adhesive tape, a tweezers, or a clamp to contact the super-aligned array.

In step (b), the pulling direction is substantially perpendicular to the growing direction of the super-aligned array of carbon nanotubes. Each carbon nanotube segment includes a plurality of carbon nanotubes parallel to each other.

More specifically, during the pulling process, as the initial carbon nanotube segments are drawn out, other carbon nanotube segments are also drawn out end to end due to van der Waals attractive force between ends of adjacent segments. This process of drawing ensures a substantially continuous and uniform carbon nanotube film having a predetermined width can be formed. The carbon nanotube drawn film comprises a plurality of carbon nanotubes joined ends to ends. The carbon nanotubes in the carbon nanotube film are all substantially parallel to the pulling/drawing direction of the carbon nanotube drawn film, and the carbon nanotube drawn film produced in such manner can be selectively formed to have a predetermined width. The carbon nanotube drawn film formed by the pulling/drawing method has superior uniformity of thickness and conductivity over a typical disordered carbon nanotube drawn film. Further, the pulling/drawing method is simple, fast, and suitable for industrial applications.

The width of the carbon nanotube drawn film depends on a size of the carbon nanotube array. The length of the carbon nanotube film can be arbitrarily set, as desired. In one embodiment, when the substrate is a 4-inch P-type silicon wafer as in the present embodiment, the width of the carbon nanotube drawn film is in an approximate range from 0.5 nanometers to 10 centimeters, and the thickness of the carbon nanotube drawn film is in an approximate range from 0.5 nanometers to 10 microns.

Figure 2:
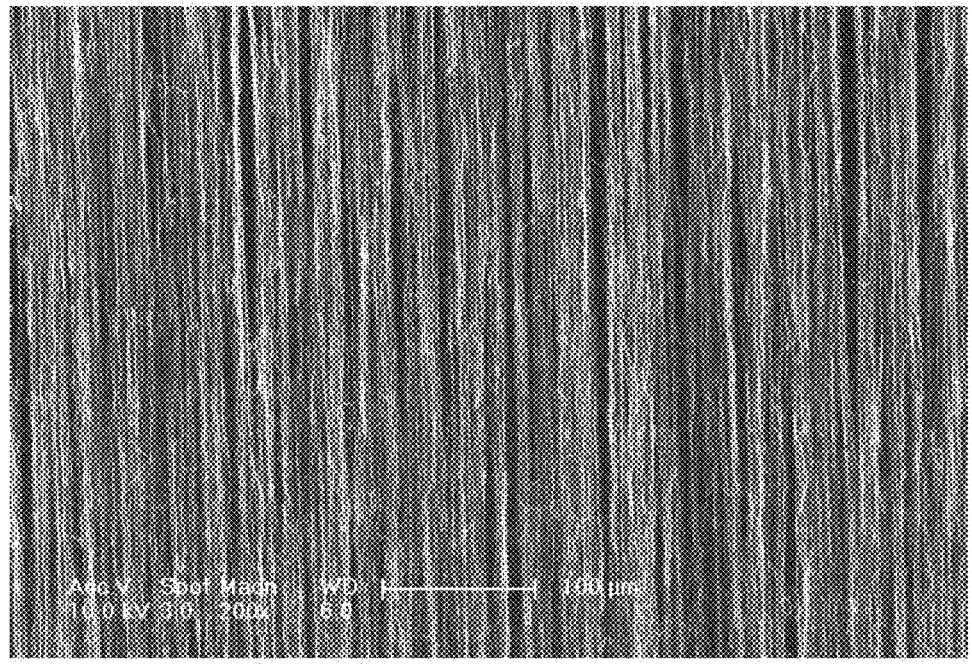
FIG. 2 is an SEM image of a carbon nanotube drawn film.
Figure 3:
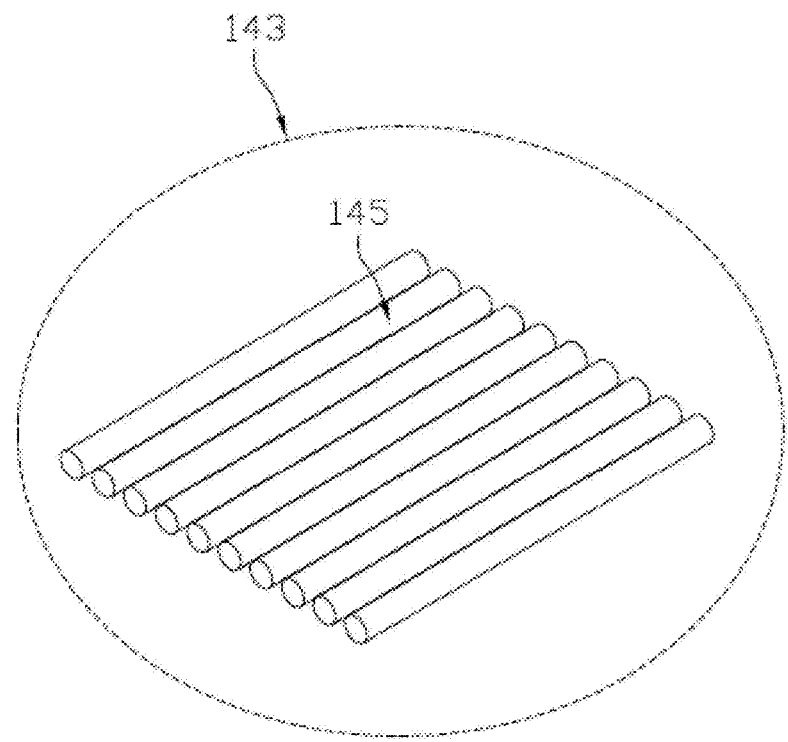
FIG. 3 is a side view of carbon nanotube segment.

Referring to FIG. 2 and FIG. 3, each carbon nanotube drawn film comprises a plurality of successive and oriented carbon nanotubes joined end to end by van der Waals attractive force. Each carbon nanotube drawn film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube drawn film 143 are also oriented along a preferred orientation.

The carbon nanotube drawn film comprises a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube drawn film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

Some variation can occur in the orientation of the carbon nanotubes in the carbon nanotube drawn film. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded.

The carbon nanotube film comprises at least two stacked carbon nanotube drawn films. Adjacent drawn carbon nanotube films can be combined by only Van der Waals attractive forces therebetween without the need of an additional adhesive. An angle between the aligned directions of the carbon nanotubes in the two adjacent carbon nanotube drawn films can range from about 0 degrees to about 30 degrees. In one embodiment, the angle between the aligned directions of the carbon nanotubes in the two adjacent carbon nanotube drawn films is 0 degrees.

Further, the method comprises a step of: depositing a carbon layer on a surface of the first carbon nanotube structure after step S1. The carbon layer is uniformly coated on the surface of the first carbon nanotube structure. The carbon layer can further increase the mechanical properties of the first carbon nanotube structure, thereby increasing the emission stability of the carbon nanotube field emitter.

In step (S2), the first carbon nanotube structure is heated to graphitize the first carbon nanotube structure by the following substeps: (S21) placing the first carbon nanotube structure in a graphite crucible and then placing the graphite crucible in a graphitization furnace; (S22) heating the first carbon nanotube structure to a temperature ranging from about 2000° C. to about 3000° C. for about 10 to 300 minutes in the graphite furnace with an inert gas; (S23) cooling to room temperature to form the second carbon nanotube structure. Then, the second carbon nanotube structure can be took out of the graphite furnace. In one embodiment, the first carbon nanotube structure is placed in the graphite crucible and then placed the graphite crucible in the graphitization furnace, then the first carbon nanotube structure is heated to about 2800° C. for about 60 minutes under argon gas protection, and the temperature of the graphitization furnace is cooled to room temperature to form the second carbon nanotube structure. The second carbon nanotube structure is then taken out of the graphitization furnace.

The heat treatment of the first carbon nanotube structure can remove high temperature volatile impurities (such as metal catalysts) in the first carbon nanotube structure to graphitize the first carbon nanotube structure, and eliminate microscopic structural defects.

In step (S3), welding at least two electrodes to fix one end of at least one second carbon nanotube structure between adjacent two electrodes to form a field emission preparation body by spot welding or laser welding. The field emission preparation body has a emission end.

Figure 4:
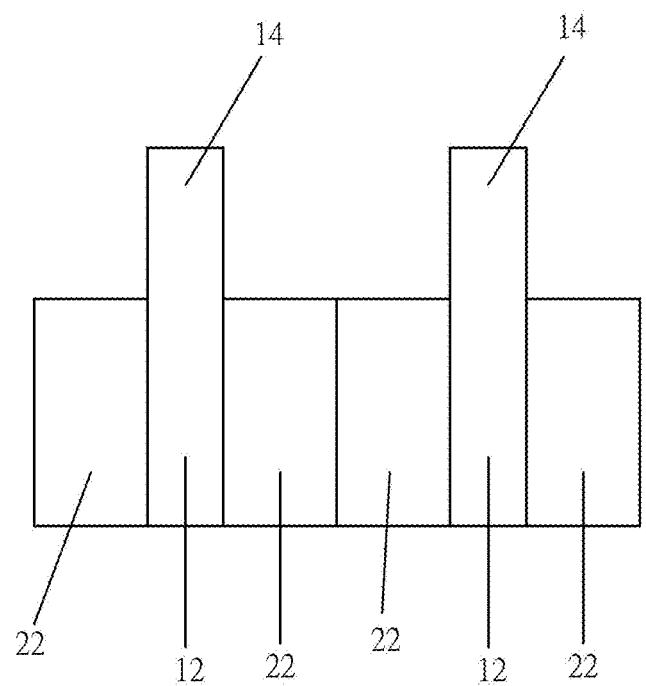
FIG. 4 is a side view of one embodiment of a field emission preparation body.

Referring to FIG. 4, the second carbon nanostructure comprises a first end 12 and a second end 14, and the first end 12 is opposite to the second end 14. The at least two electrodes 22 are fixed together by spot welding or laser welding, thereby fixing at least one first end 12 between the adjacent two electrodes 22 and exposing the second end 14 as the emission end of the field emission preparation body.

The first end 12 of the second carbon nanostructure is fixed between the adjacent two electrodes 22 by spot welding comprises the following substeps: S311, placing the first end 12 of the at least one second carbon nanostructure between the adjacent two electrodes 22, wherein the adjacent two electrodes 22 clamps the first end 12, and the second end 14 is exposed to form an emission unit; S312, placing the emission unit between a fixed welding head and a movable spot welding head, and driving a pressure driving device to press the movable spot welding head against the fixed spot welding head; S313, controlling a spot welder output a voltage and a current to weld the adjacent two electrodes 22 together to fix the first end 12 of the at least one the second carbon nanostructure.

In step S311, when the first end 12 of the second carbon nanotube structure is placed between the adjacent two electrodes 22, the plurality of carbon nanotubes of the second carbon nanotube structure extend along a length direction of the second end 14. That is, the extending direction of the carbon nanotubes in the second carbon nanostructure is parallel to the electron emission direction of the carbon nanotube field emitter. In one embodiment, each first end 12 is placed between two electrodes 22.

In step S312, when the pressure driving device is driven, a pressure between the movable spot welding head and the fixed spot welding head is ranged from about 50N to about 20N. In step S313, welding the lower edges of the two electrodes 22 to weld the two electrodes 22 together to fix the first end 12 of the second carbon nanotube structure. The output voltage is ranged from about 2.3V to about 10V, the output current is 800 A, and the output voltage and current release time are controlled at a range about 200 ms to 300 ms.

Furthermore, when the carbon nanotube field emitter comprises a plurality of the emission units, the method of making for the carbon nanotube field emitter may comprises a step of repeatedly stacking a plurality of the emission units after step S311.

When the first end 12 of the at least one second carbon nanotube structure is fixed between the at least two electrodes 22 by laser welding comprises the following substeps: S321, placing the first end 12 of the at least one second carbon nanotube structure between the adjacent two electrodes 22, wherein the adjacent two electrodes 22 clamps the first end 12, and the second end 14 is exposed to form an emission unit; S322, clamping and fixing the emitting unit with a clamp; S323, welding the adjacent two electrodes 22 by laser irradiation to fix the first end 12 of the at least one second carbon nanotube structure.

In step S321, when the first end 12 of the second carbon nanotube structure is placed between the two electrodes 22, the plurality of carbon nanotubes of the second carbon nanotube structure extend along a length direction of the second end 14. That is, the extending direction of the carbon nanotubes in the second carbon nanostructure is parallel to the electron emission direction of the carbon nanotube field emitter. In one embodiment, each first end 12 is placed between two electrodes 22.

In step S323, the laser may be any type of laser as long as heating can be produced, such as, a carbon dioxide laser, a semiconductor laser, an ultraviolet laser, or a yttrium aluminum garnet (YAG) laser. A diameter of the laser beam ranges from about 10 micrometers to about 400 micrometers. A power of the laser beam ranges from about 3.6 watts to about 1.5 kilowatts. A laser pulse frequency of the laser beam ranges from about 20 kHz to 40 kHz. In one embodiment, the laser is the YAG laser, a wavelength of the YAG laser is 1.06 μm, a laser beam spot diameter of the YAG laser is 20 μm, a power of the YAG laser is 1.5 KW, and a laser pulse frequency of the YAG laser is 20 kHz.

Furthermore, when the carbon nanotube field emitter comprises a plurality of the emission units, the method of making for the carbon nanotube field emitter may comprises a step of repeatedly stacking a plurality of the emission units after step S321.

The material of the electrode 22 may be gold, silver, copper, or nickel. A thickness of the electrode 22 ranges from about 50 micrometers to about 150 micrometers. The electrode 22 can be a sheet-like structure or a flattened tubular structure. When the electrode 22 is a flattened tubular structure, the first end 12 of the at least one second carbon nanotube structure is disposed in the intermediate space of the flattened tubular structure and clamped by the flattened tubular structure. The first end 12 of the at least one second carbon nanotube structure is fixed in the flattened tubular structure by welding the bottom of the flattened tubular structure. In one embodiment, the electrode 22 consists of a flattened nickel tube. The first end 12 of the at least one second carbon nanotube structure is disposed in the intermediate space of the flattened nickel tube and is clamped by the flattened nickel tube, and then the first end 12 of the at least one second carbon nanotube structure is fixed in the flattened nickel tube by welding the flattened nickel tube. A wall thickness of the nickel tube is 100 microns.

Further, before step S2, the method comprises a step of: cutting the second carbon nanotube structure. In this step, the second carbon nanotube structure is cut to a desired size as needed. In one embodiment, the second carbon nanotube structure is cut into a sheet structure. The length of the sheet structure is about 4 mm, and the width of the sheet structure is about 2 mm.

In step S4, the emission end of the field emission preparation body, that is, the second end 14 of the second carbon nanotube structure, may be treated by a tape or a liquid glue. A part of carbon nanotube of the second end 14 are pulled upright and form a plurality of burrs by peeling off the tape or the liquid. In one embodiment, the tape is directly adhered to the surface of the second end 14, and then the tape is peeled off to surface the second end 14. A part of the carbon nanotubes are pulled upright.

The carbon nanotube field emitter formed by using the liquid glue comprises following substeps: S41, a liquid glue is disposed on the surface of the second end 14; S42, curing the liquid glue; S43, peeling off the cured liquid glue on the surface of the second end 14 to pull upright the carbon nanotubes on the surface of the second end 14. The liquid glue may be a thermosetting glue, a thermoplastic glue or an ultraviolet curing glue. Specifically, the liquid glue may be liquid silica glue, polysiloxane ester liquid crystal (PMMS), ultraviolet curable glue or the like. In step S42, the thermosetting glue is cured by a stepwise heating. The thermoplastic glue is cured by cooling. The ultraviolet curing glue can be cured by ultraviolet light irradiation. Since a portion of the liquid glue penetrates into gaps of the second end 14, the bonding force between the cured liquid glue and the second 14 is strong. In step S43, the cured liquid glue may be directly peeled off the cured liquid glue with tweezers or other tools. A part of the carbon nanotubes on the surface of the second end 14 is pulled upright by peeling off the cured liquid glue.

Further, after step S3 before step S4, the method comprises a step of: cutting the second end 14 of the field emission preparation body with a laser.

The second end 14 is cut along a predetermined cutting line by a laser beam from a laser controller controlled by a computer. The laser may be any type of laser as long as the heating can be produced, such as, a carbon dioxide laser, a semiconductor laser, an ultraviolet laser, or a yttrium aluminum garnet (YAG) laser. The wavelength, power, scanning speed, and laser beam spot diameter of the laser beam can be set according to actual needs. The cutting line is a curve. The curve is a combination of a plurality of zigzags, a plurality of elliptical shapes, a plurality of semicircles, or any other pattern. In one embodiment, the cutting line comprises a plurality of zigzags. A distance from a tip of the cutting line to the top of the electrode 22 is ranged from about 100 micrometers to about 5 millimeters. In one embodiment, the distance from the tip of the cutting line to the top of the electrode 22 is ranged from about from 100 micrometers to about 1 millimeter. In another embodiment, the distance from the tip of the cutting line to the top of the electrode 22 is 250 micrometers.

Further, after the second end 14 is cut by laser, the method comprises a step of: ultrasonically cleaning the second end 14. Ultrasonically cleaning the second end 14 can remove loose carbon nanotubes and impurities in the second end 14 which is beneficial to improve the field emission performance and lifetime of the carbon nanotube field emitter.

In one embodiment, the field emission preparation body cut by laser is placed in an organic solvent for ultrasonic cleaning for about 15 minutes to about 1 hour, and then the field emission preparation body is dried. The ultrasonic cleaning frequency is ranged from about 3 kHz to 10 kHz, and the organic solvent is deionized water.

Further, the method comprises a step of: depositing a carbon layer on a surface of the at least one graphitized carbon nanotube wire after step S2. The carbon layer is uniformly coated on the surface of the at least one graphitized carbon nanotube wire to form a carbon nanotube wire composite structure. The carbon layer can further increase the mechanical properties of the graphitized carbon nanotube wire, thereby increasing the emission stability of the carbon nanotube field emitter.

Figure 5:
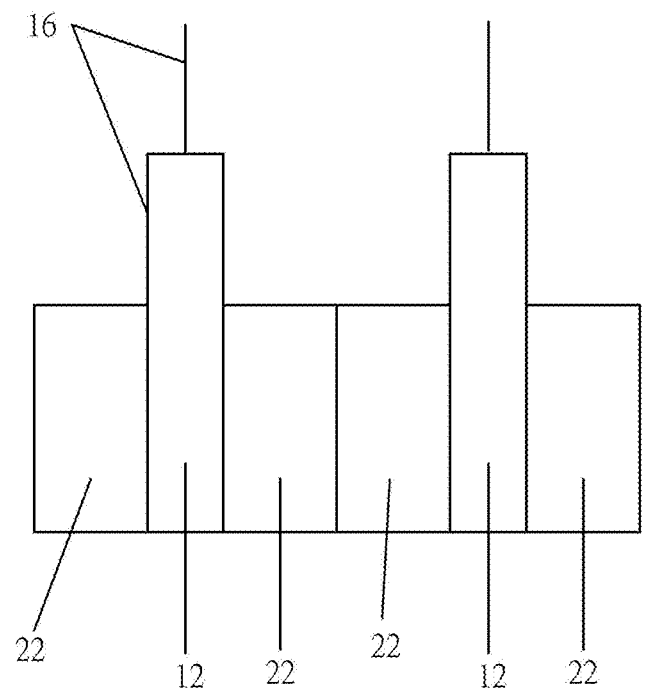
FIG. 5 is a side of one embodiment of the carbon nanotube field emitter.
Figure 6:
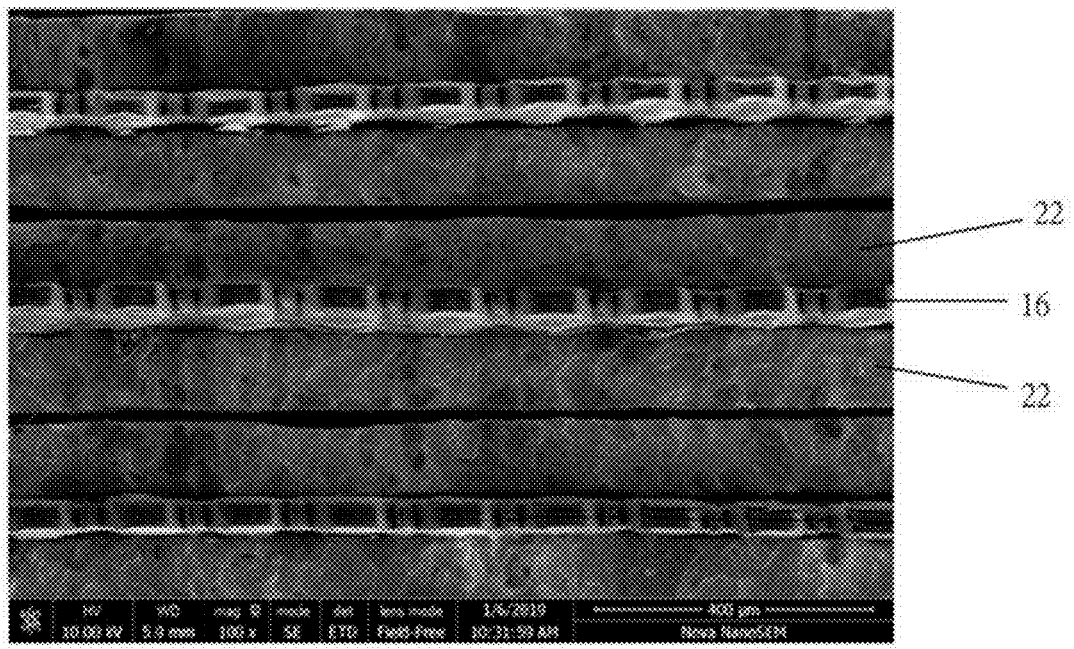
FIG. 6 is an SEM image of one embodiment of the carbon nanotube field emitter.

Referring to FIG. 5-6, the carbon nanotube field emitter 100 prepared by the method for making the carbon nanotube field emitter is provided. The carbon nanotube field emitter comprises at least two electrodes 22 and at least one carbon nanotube structure. The carbon nanotube structure comprises a first end 12 and a field emission end 16, the first end 12 is opposite to the field emission end 16. The first end 12 of the at least one carbon nanotube structure is fixed between two adjacent electrodes 22, and the field emission end 16 of the at least one carbon nanotube structure is exposed from the at least two electrodes 22 to emit electrons. A density of the carbon nanotube structure is larger than or equal to 1.6 g/m$^3$ or more.

Figure 7:
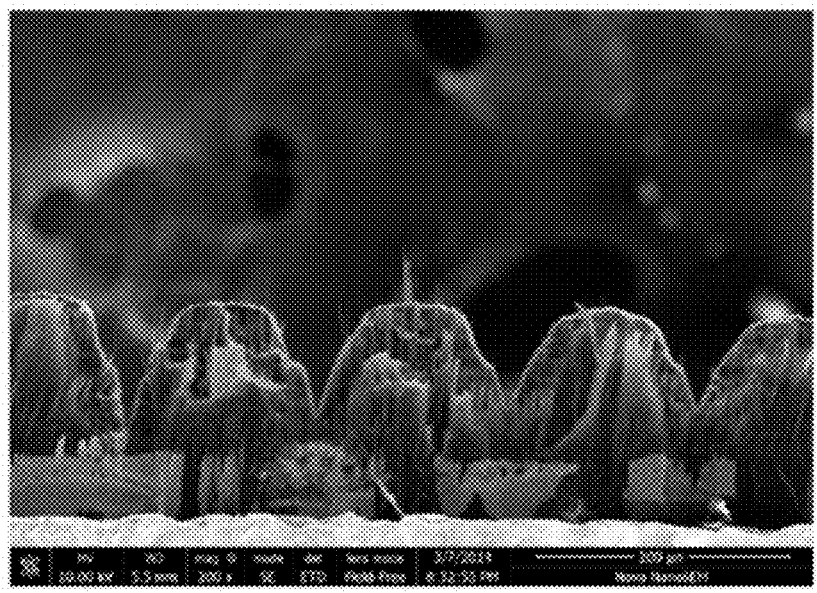
FIG. 7 is an SEM image of one embodiment of the carbon nanotube field emitter.
Figure 8:
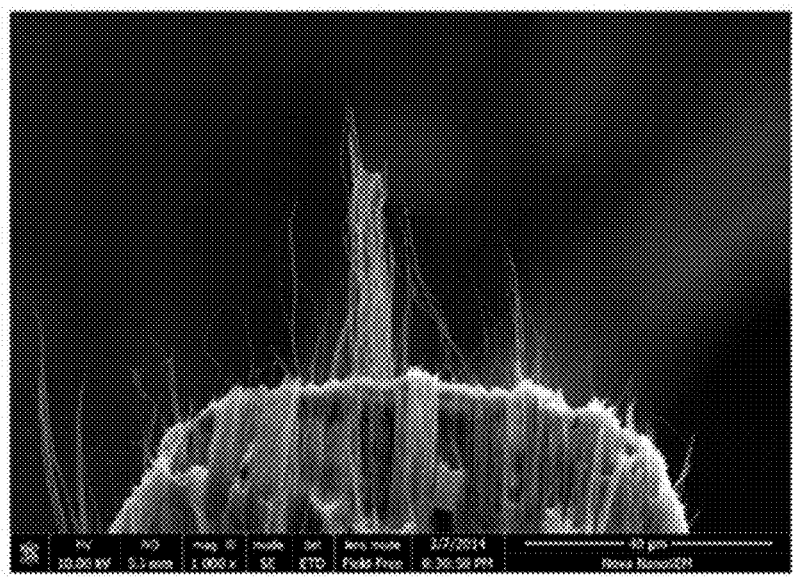
FIG. 8 is an SEM image of a field emission end of the carbon nanotube field emitter.

Referring to FIG. 7-8, the field emission end 16 comprises a plurality of protrusions and a plurality of burrs. The plurality of protrusions may be in a zigzag shape, a semicircular shape or other irregular shape or the like. The plurality of burrs are disposed on the surface of the field emission end 16. Each burr is a single carbon nanotube or a bundle of carbon nanotubes formed from a plurality of carbon nanotubes. The plurality of burrs of the field emission end 16 can reduce a surface area of the field emission tip, thereby making the local electric field more concentrated and increasing the field emission efficiency.

The carbon nanotube structure comprises a plurality of carbon nanotube drawn films, and the plurality of carbon nanotube films are stacked with each other. The number of layers of the carbon nanotube drawn film in the carbon nanotube structure is 2-10. The density of the carbon nanotube structure is larger than and equal to 1.6 g/m$^3$. In one embodiment, a thickness of the carbon nanotube structure is 50 μm. The density of the carbon nanotube structure is 1.6 g/m$^3$.

Referring to FIG. 2, the carbon nanotube drawn film comprises a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction by Van der Waals attractive force. A small number of the carbon nanotubes are randomly arranged in the carbon nanotube drawn film, and has a small if not negligible effect on the larger number of the carbon nanotubes in the carbon nanotube drawn film arranged substantially along the same direction.

The carbon nanotube drawn film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

Some variation can occur in the orientation of the carbon nanotubes in the carbon nanotube drawn film. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded.

The carbon nanotube film comprises at least two stacked carbon nanotube drawn films. Adjacent drawn carbon nanotube films can be combined by only Van der Waals attractive forces therebetween without the need of an additional adhesive. An angle between the aligned directions of the carbon nanotubes in the two adjacent carbon nanotube drawn films can range from about 0 degrees to about 30 degrees. In one embodiment, the angle between the aligned directions of the carbon nanotubes in the two adjacent carbon nanotube drawn films is 0 degrees. A plurality of carbon nanotubes in the carbon nanotube structure extend along the length direction of the field emission end 16. That is, the extending direction of the carbon nanotubes in the carbon nanotube structure is parallel to the electron emission direction of the carbon nanotube field emitter.

The electrode 22 can be a sheet structure or a flattened tubular structure. The material of the electrode 22 may be gold, silver, copper, or nickel. A thickness of the electrode 22 ranges from about 50 micrometers to about 150 micrometers. When the electrode 22 is a flattened tubular structure, the first end 12 is disposed in the intermediate space of the flattened tubular structure and is clamped by the flattened tubular structure, and then the first end 12 is fixed in the flattened tubular structure by welding the bottom of the flattened tubular structure. In one embodiment, the electrode 22 consists of a flattened nickel tube. The first end 12 is disposed in the intermediate space of the flattened nickel tube and is clamped by the flattened nickel tube, and then the first end 12 is fixed in the flattened nickel tube by welding the bottom of the flattened nickel tube. A wall thickness of the nickel tube is 100 microns.

In one embodiment, the carbon nanotube field emitter comprises a carbon layer. The carbon layer is uniformly coated on at least one surface of the carbon nanotube structure. The carbon layer can further increase the mechanical properties of the carbon nanotube structure, thereby increasing the emission stability of the carbon nanotube field emitter.

Embodiment 1

The carbon nanotube film is heated at a temperature of 1600° C. and a pressure of 50 MPa for 6 min to form a first carbon nanotube structure. The carbon nanotube film are formed by stacking three carbon nanotube drawn films. The first carbon nanotube structure is placed in the graphite crucible and then the graphite crucible is in the graphitization furnace, then the first carbon nanotube structure is heated to about 2800° C. for about 60 minutes under argon gas protection, and the temperature of the graphitization furnace is cooled to room temperature to form the second carbon nanotube structure. The second carbon nanotube structure is then taken out of the graphitization furnace. A thickness of the second carbon nanotube structure is about 50 microns. The second carbon nanotube structure is cut into a sheet structure. The length of the sheet structure is about 4 mm, and the width of the sheet structure is about 2 mm. A pure nickel tube is flattened to sandwich the first end of the second carbon nanostructure to form an emission unit. A thickness of the pure nickel tube is about 100 microns. Three emission units are stacked, and the three emission units are sandwiched by a clamp. Then, the lower edges of stacked three emission units is irradiated by the YAG laser beam. The flattened nickel tubes are welded together and a plurality of second ends are fixed between two adjacent electrodes to form a field emission preparation body. The field emission preparation comprises a emission end, that is, the second end of the first carbon nanotube structure. A wavelength of the YAG laser is 1.06 µm, a laser beam spot diameter of the YAG laser is 30 µm, a power of the YAG laser is 12 W, and a laser pulse frequency of the YAG laser is 20 kHz. Then, the second end 14 is cut by the YAG laser to form a plurality of zigzags. the field emission preparation body cut by laser is placed in an organic solvent for ultrasonic cleaning for about 15 minutes to about 1 hour, and then the field emission preparation body is dried. A tape is directly adhered to the surface of the second end 14. A part of the carbon nanotubes are pulled upright to form a carbon nanotube field emitter by peeling off the tape from the surface the second end 14.

Figure 9A:
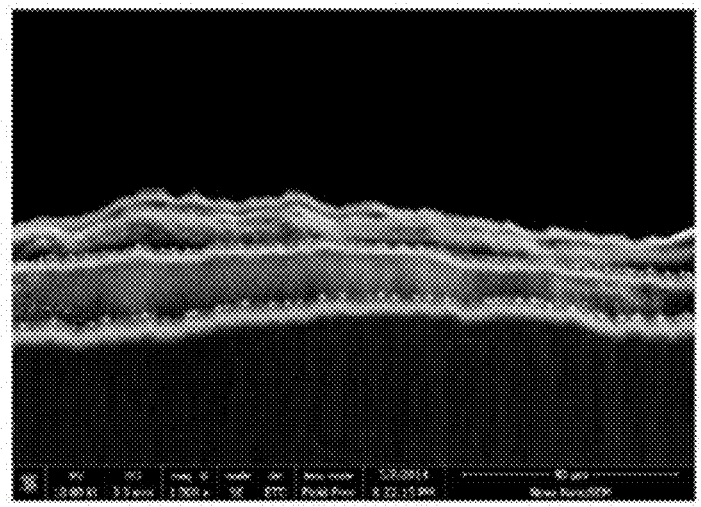
FIG. 9A is an SEM image of a emission end of the field emission preparation body after cutting by a laser.
Figure 9B:
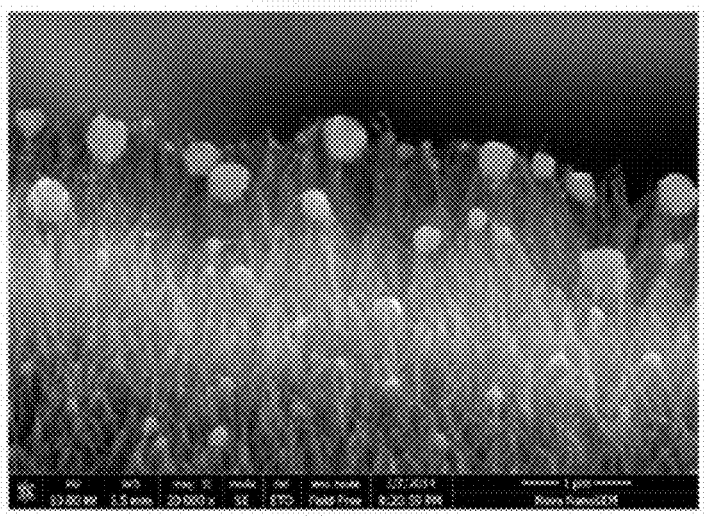
FIG. 9B is a partial enlargement SEM image FIG. 9A.
Figure 10A:
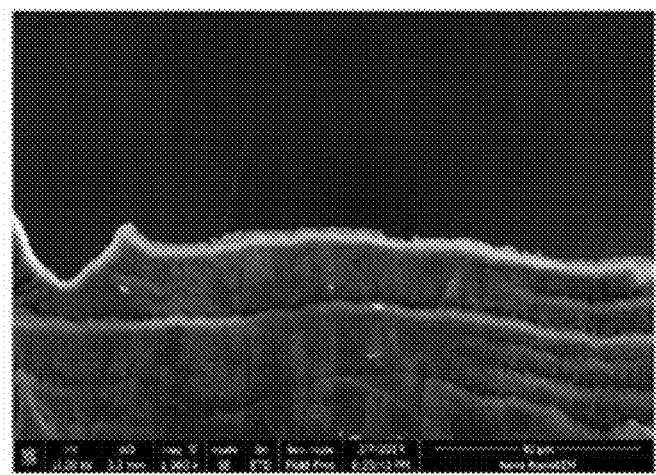
FIG. 10A is an SEM image of a emission end of the field emission preparation body after ultrasonically cleaning.
Figure 10B:
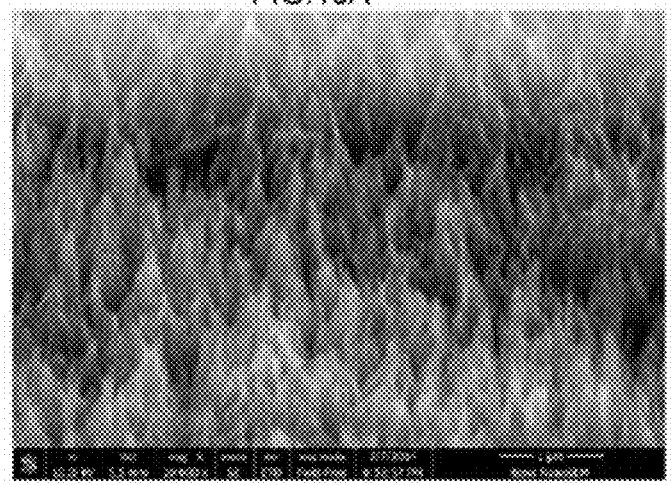
FIG. 10B is a partial enlargement SEM image FIG. 10A.

FIG. 9A and FIG. 9B are scanning electron micrographs of the emitting end of the field emission preparation body after laser beam cutting. FIG. 10A and FIG. 10B are scanning electron micrographs of the emitting end of the field emission preparation body after ultrasonic cleaning. As shown in FIG. 9A and FIG. 9B, the emission end of the field emission preparation after laser beam cutting has a small amount of impurities. Comparing FIG. 9A and FIG. 9B with FIG. 10A and FIG. 10B, it can be seen that after the ultrasonic cleaning, the impurities at the emitting end of the field emission preparation body are removed.

Figure 11:
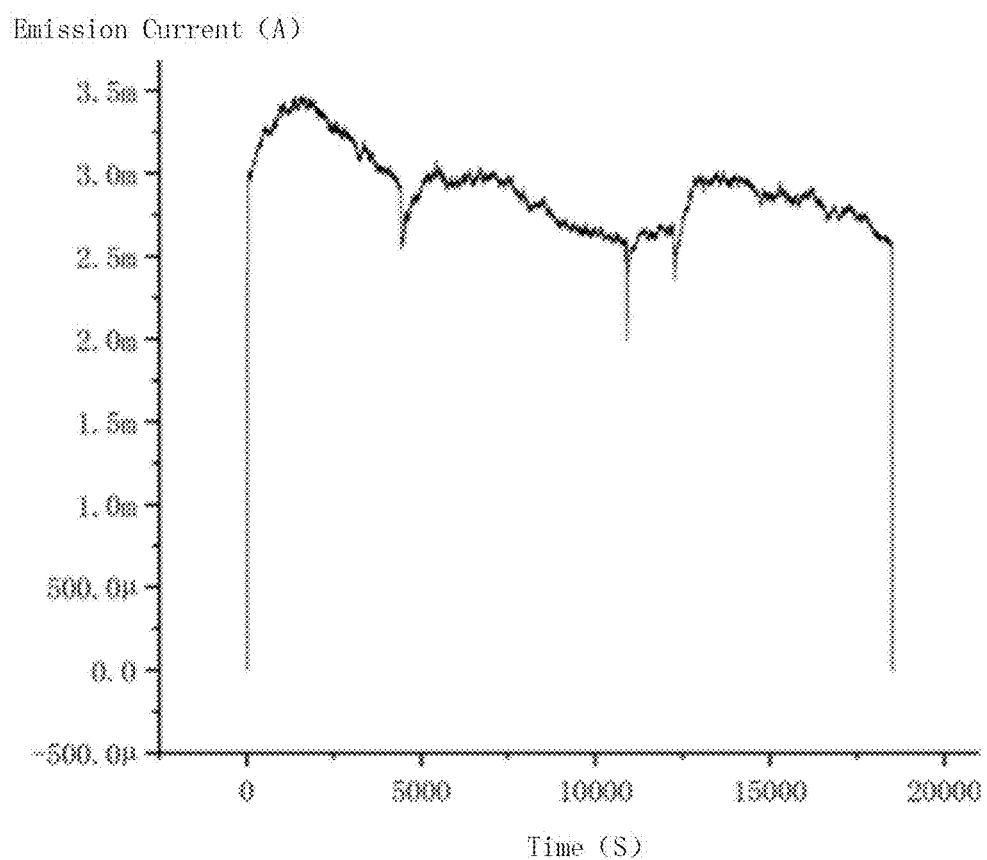
FIG. 11 is a electron emission current change curve graph of a carbon nanotube field emitter with time.

FIG. 11 is a electron emission current change curve graph of a carbon nanotube field emitter with time. As shown in FIG. 11, the field emission current of the carbon nanotube field emitter is 2.5 mA to 3.5 mA in the test time of 20,000 seconds. It can be seen that the efficiency of electron emission of the carbon nanotube field emitter is high, and the emission characteristics change little with time, and the carbon nanotube field emitter has stable field emission.

Figure 12:
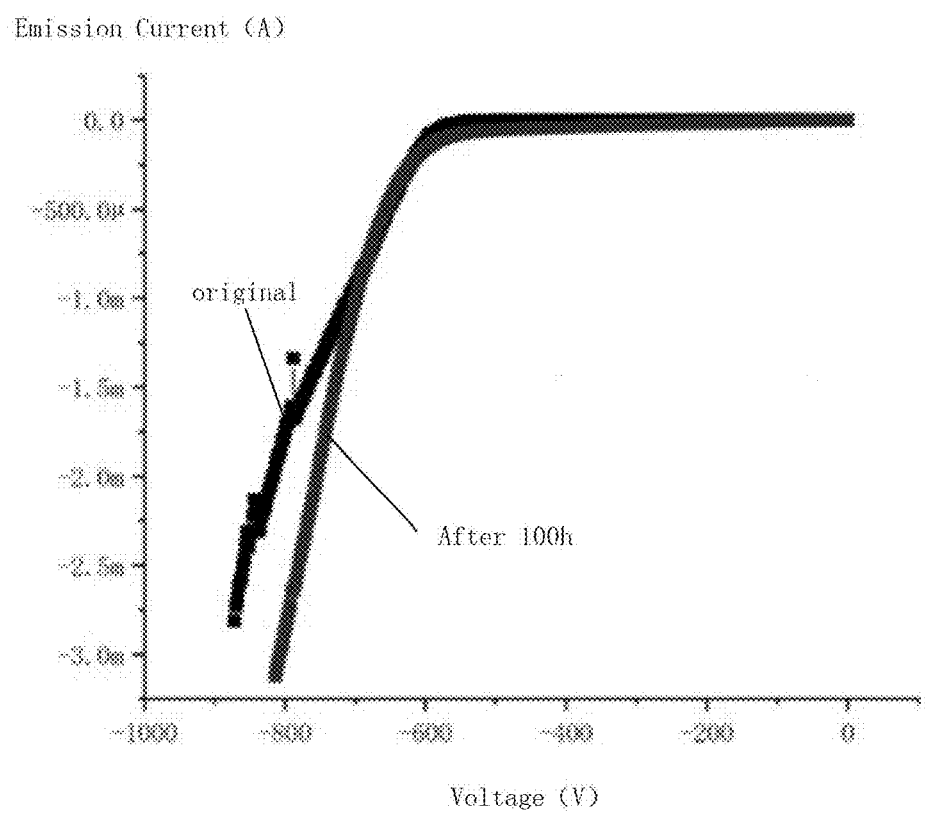
FIG. 12 is a current change curve graph of the carbon nanotube field emitter in a vacuum with voltage.
Figure 13:
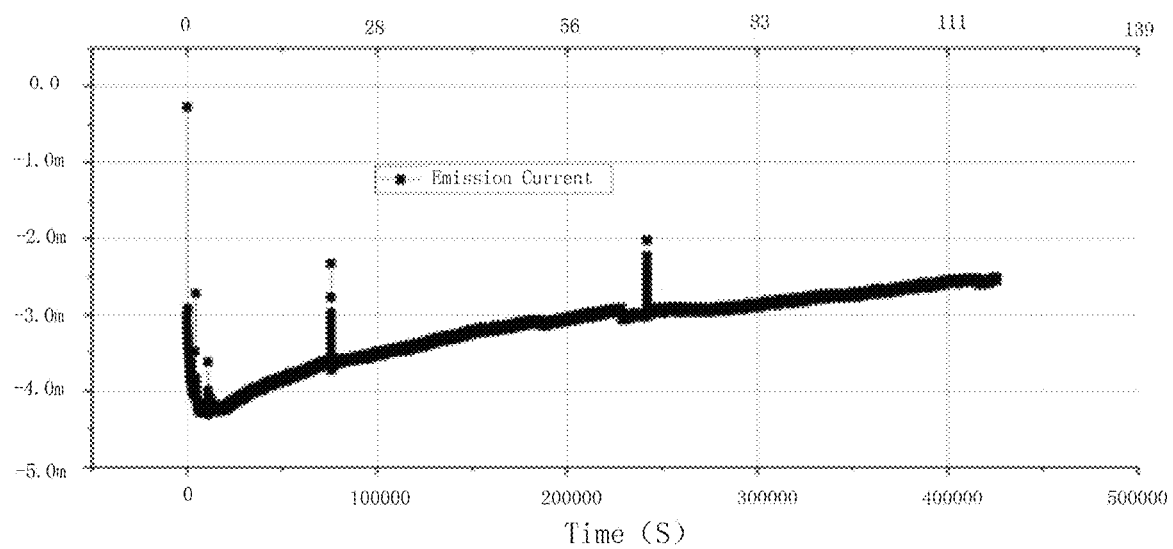
FIG. 13 is a current change curve graph of the carbon nanotube field emitter in a vacuum with time.

FIG. 12 is a current change curve graph of the carbon nanotube field emitter in a vacuum with voltage. As shown in FIG. 12, a current curve of the carbon nanotube field emitter after 100 hours is basically the same as an original current curve. FIG. 13 is a current change curve graph of the carbon nanotube field emitter in a vacuum with time. It can be seen that the electron emission current does not change much with time. FIG. 12 and FIG. 13 illustrate that the carbon nanotube field emitter has a higher efficiency of emitting electrons in a vacuum, and the emission characteristics do not change much with time.

Figure 14:
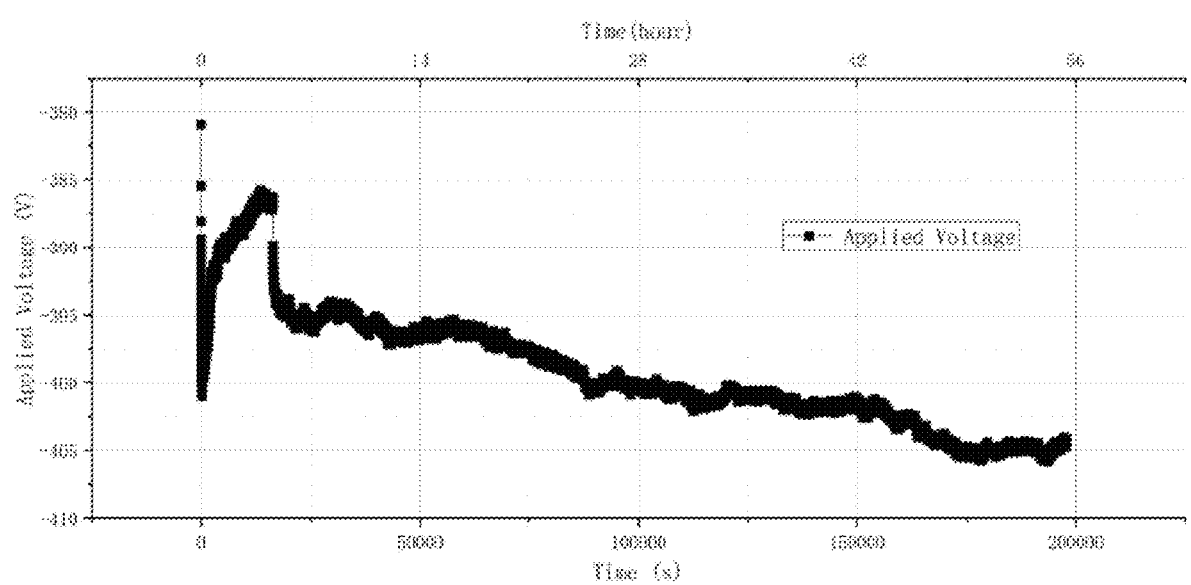
FIG. 14 is a graph showing changes in applied voltage and working time of a carbon nanotube field emitter.

Referring to FIG. 14, it can be seen from the figure that the voltage applied to the carbon nanotube field emitter does not change much with time, indicating that the emission stability of the carbon nanotube field emitter is relatively good.

Figure 15:
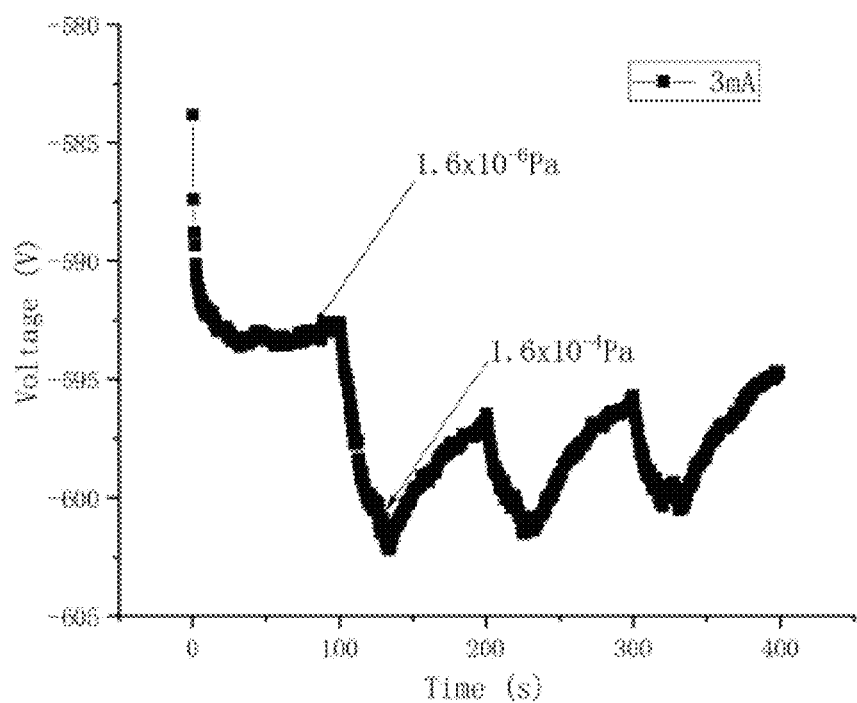
FIG. 15 is a graph showing changes in voltage and working time of carbon nanotube field emitters under different degrees of vacuum environment.

Referring to FIG. 15, when the degree of vacuum is $1.6 \times 10^{-6}$ Pa, and the emission current is 3 mA, the voltage of the carbon nanotube field emitter does not change much with time, indicating that the emission stability of the carbon nanotube field emitter is good in a vacuum of $1.6 \times 10^{-6}$ Pa.

The carbon nanotube field emitter provided by the invention has the following advantages: Firstly, the density of the carbon nanotube structure in the carbon nanotube field emitter is large. Thus, the electron emission current can be increased, and the volume of the carbon nanotube field emitter can be reduced. Secondly, the heating treatment of carbon nanotube film can remove the catalyst and repair the defects of the carbon nanotubes. Therefore, the stability and service life of the carbon nanotube field emitter can be improved. Thirdly, the carbon nanotube v can be firmly fixed between the adjacent two electrodes by the welding the electrode, and the bonding force between the carbon nanotube structure and the electrode can be improved. Thus, the carbon nanotube structure does not detach from the electrode during electron emission, and the emission efficiency and service life of the carbon nanotube field emitter can be improved.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A carbon nanotube field emitter, comprising:
at least two electrodes and at least one graphitized carbon nanotube structure, wherein the at least one graphitized carbon nanotube structure comprises a first end and a field emission end, the first end is opposite to the field emission end, the first end is fixed between the at least two electrodes, and the field emission end is exposed from the at least two electrodes and configured to emit electrons, wherein the graphitized carbon nanotube structure comprises a plurality of carbon nanotube drawn films stacked with each other.

2. The carbon nanotube field emitter of claim 1, wherein a density of the graphitized carbon nanotube structure is larger than or equal to 1.6 g/m³.

3. The carbon nanotube field emitter of claim 1, wherein the field emission end comprises a plurality of protrusions and a plurality of burrs.

4. The carbon nanotube field emitter of claim 1, wherein an angle between an aligned directions of carbon nanotubes in two adjacent carbon nanotube drawn films ranges from about 0 degrees to about 30 degrees.

5. The carbon nanotube field emitter of claim 1, wherein the angle between an aligned directions of carbon nanotubes in the two adjacent carbon nanotube drawn films is 0 degrees.

6. The carbon nanotube field emitter of claim 1, wherein each carbon nanotube drawn film comprises a plurality of carbon nanotubes, and the plurality of carbon nanotubes are arranged parallel to a surface of a carbon nanotube drawn film.

7. The carbon nanotube field emitter of claim 6, wherein the plurality of carbon nanotubes in in the carbon nanotube drawn film are arranged along a same direction.

8. The carbon nanotube field emitter of claim 7, wherein an end of one carbon nanotube is joined to another end of an adjacent carbon nanotube arranged along the same direction by Van der Waals attractive force.

9. The carbon nanotube field emitter of claim 1, wherein the at least one graphitized carbon nanotube structure comprises a plurality of carbon nanotubes, and the plurality of carbon nanotubes extend along a length direction of the field emission end.

10. The carbon nanotube field emitter of claim 1, wherein the at least two electrodes consists of at least one flattened nickel tube.

11. The carbon nanotube field emitter of claim 1, wherein the carbon nanotube field emitter comprises a carbon layer, and the carbon layer is uniformly coated on a surface of the at least one graphitized carbon nanotube structure.

12. A carbon nanotube field emitter, comprising:
at least two electrodes and at least one graphitized carbon nanotube structure, wherein the at least one graphitized carbon nanotube structure comprises a first end and a field emission end, the first end is opposite to the field emission end, the first end is fixed between the at least two electrodes, the field emission end is exposed from the at least two electrodes and configured to emit electrons, wherein the carbon nanotube field emitter comprises a carbon layer, and the carbon layer is uniformly coated on a surface of the at least one graphitized carbon nanotube structure.

13. A carbon nanotube field emitter, comprising:
at least two electrodes and at least one graphitized carbon nanotube structure, wherein the at least one graphitized carbon nanotube structure comprises a first end and a field emission end, the first end is opposite to the field emission end, the first end is fixed between the at least two electrodes, the field emission end is exposed from the at least two electrodes and configured to emit electrons, wherein the at least two electrodes consists of at least one flattened nickel tube.

* * * * *